Figure 1:
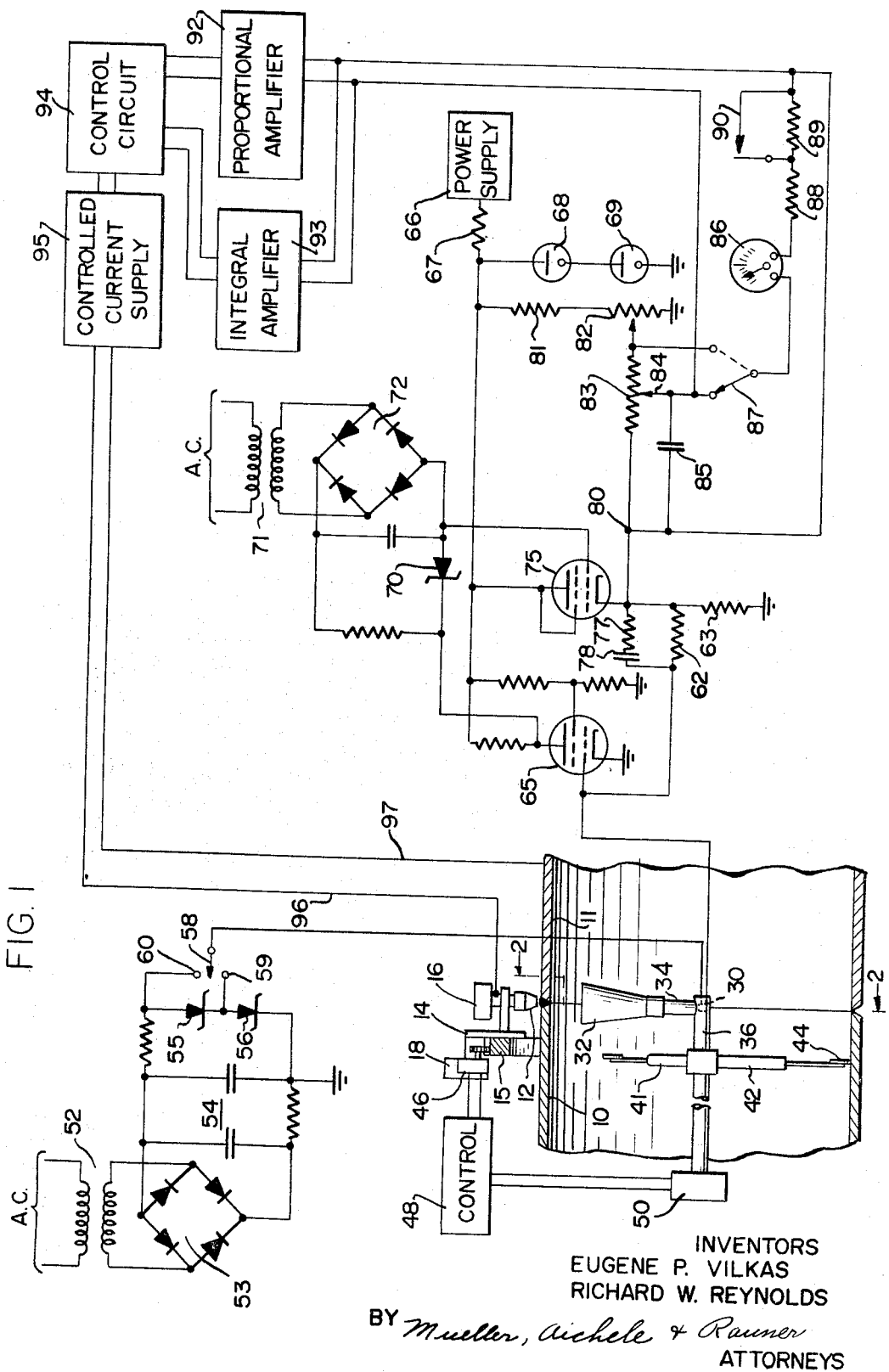

INVENTORS
EUGENE P. VILKAS
RICHARD W. REYNOLDS

BY Mueller, Aichele & Rauner
ATTORNEYS

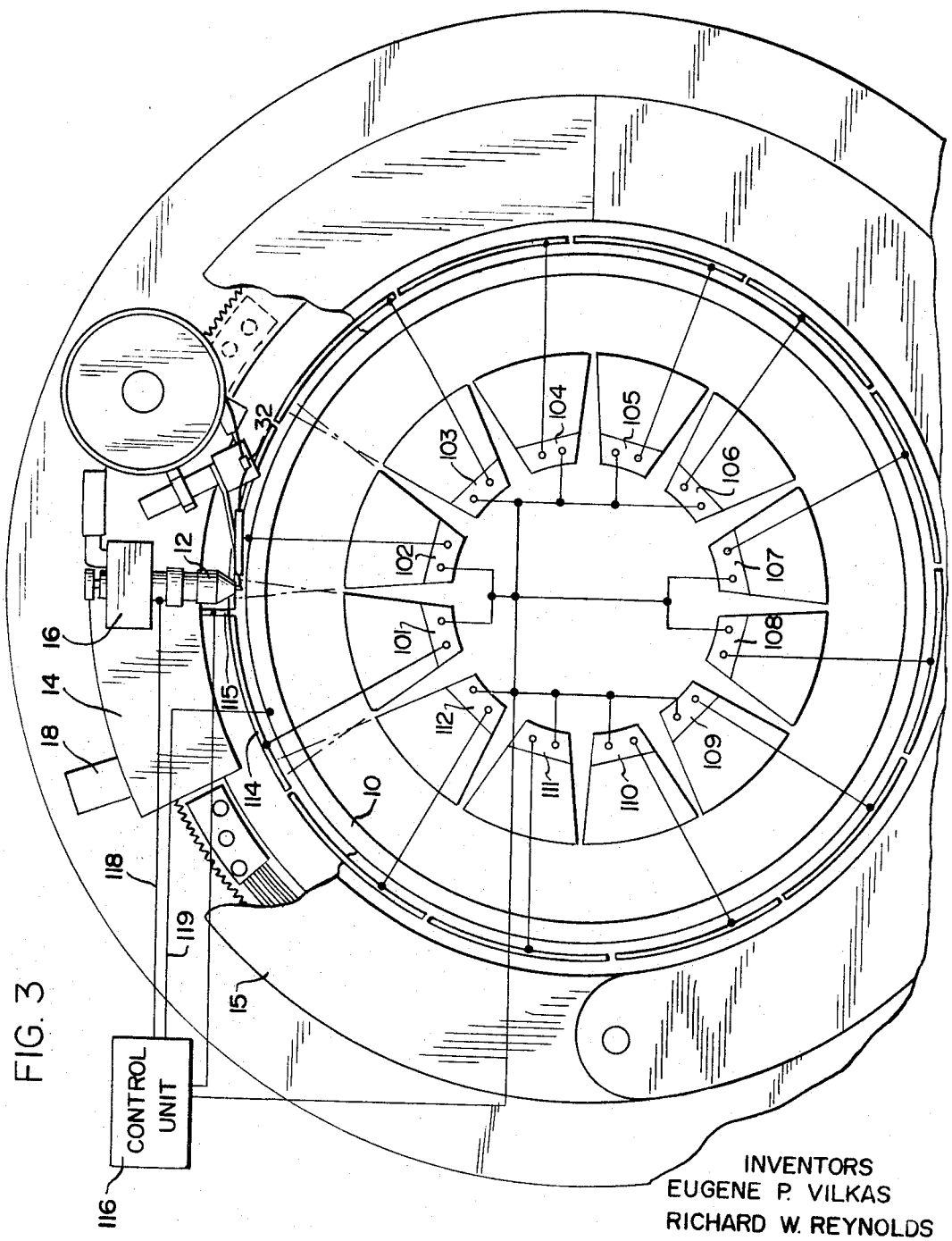

United States Patent Office 3,335,254
Patented Aug. 8, 1967

3,335,254
WELDING SYSTEM FOR TUBULAR ARTICLES WITH WELD PENETRATION CONTROL
Eugene P. Vilkas, Chicago, and Richard W. Reynolds, Hazel Crest, Ill., assignors to Welding Research, Inc., Chicago, Ill., a corporation of Illinois
Filed Oct. 17, 1966, Ser. No. 587,157
10 Claims. (Cl. 219—60)

This invention relates to control systems for welding apparatus, and more particularly to a system for welding tubular members wherein the weld penetration is automatically controlled.

In automatic arc welding systems, it may be desired that constant weld penetration take place over a long welded seam. Because of variations in the material being welded, it is necessary to provide continuous control to obtain constant weld penetration. It has been found that an effective control must respond to the radiation from the molten metal of the weld itself to thereby measure the weld penetration and control the welding current to provide the desired weld penetration.

The copending patent application of Eugene P. Vilkas and Richard W. Reynolds, Ser. No. 488,193, filed Sept. 17, 1965, now Patent No. 3,299,250 is directed to an automatic weld penetration control system. The present invention is directed to an improvement of the welding control system of the above application wherein the apparatus is adapted to weld tubular members, and to automatically sense the weld penetration as a seam is provided about the periphery of a tubular structure.

It is, therefore, an object of the present invention to provide an improved welding system for welding seams in tubular structures.

Another object of the invention is to provide an automatic welding system for welding tubular members wherein infrared radiation from the welded seam is optically sensed to control the current applied and thereby control the weld penetration.

A further object is to provide a welding system for automatically welding tubular pieces wherein an electrode is moved about the periphery of the pieces to weld a seam therein and a sensing device within the tubular structure operates synchronously with the electrode to sense the radiation from the welded seam and control the welding current to provide constant weld penetration.

A feature of the invention is the provision of an automatic welding system for welding tubular members including a welding electrode and an annular supporting structure therefor adapted to be positioned about the tubular member on which the electrode moves to weld a seam in the periphery thereof, with a radiation sensitive device inside the tubular piece selectively sensing the part of the tubular member being welded. The sensing device may include a sensing element rotated in synchronism with the movement of the electrode, or a pluarlity of sensing elements each adapted to sense one portion of the periphery of the tubular member and selectively activated to sense the portion being welded.

Figure 2:
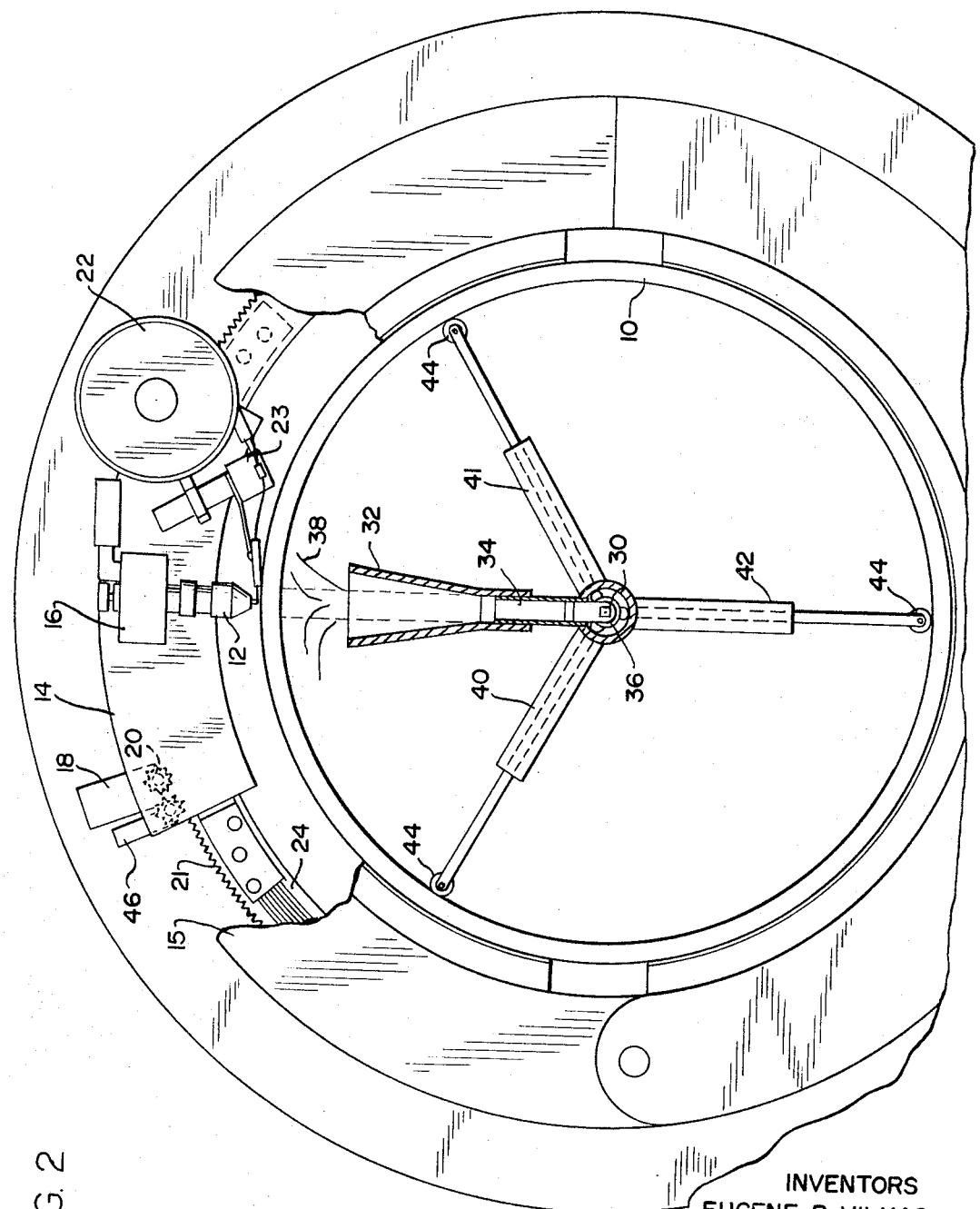

The invention is illustrated in the drawings wherein:
FIG. 1 illustrates the system of the invention;
FIG. 2 is a cross sectional view along the lines 2—2 of FIG. 1 showing the electrode and sensing device; and
FIG. 3 illustrates an alternate form of the sensing device.

In accordance with the invention, welding apparatus is provided for automatically controlling weld penetration by sensing the radiation from the metal of the workpiece being welded. A photocell may be used to sense infrared radiation from the welded material on the side opposite from the welding electrode. The system can be used for controlling the welding of a seam between two abutting tubular members. In such case, the welding electrode is supported on an annular structure about the tubular members and rotates about the periphery of the members to weld a seam therebetween. The sensing device is positioned within the tubular members and can be supported for angular movement therein so that the sensing element receives radiation from the portion being welded. Alternately a plurality of sensing elements can be supported in fixed positions to receive radiation from different portions of the periphery of the annular welded seam, and these elements can be selectively switched into the control circuit in synchronism with the movement of the welding electrode thereabout.

In FIG. 1 there is illustrated the welding system of the invention for welding a seam at the abutment of two tubular members 10 and 11. The control system for the welding current is that shown in application Ser. No. 488,193, referred to above. The welding electrode 12 is supported by a skate 14 positioned on annular supporting structure 15 so that it can move around the periphery of the seam. For an understanding of the supporting structure, reference is made to FIG. 2 which should be considered along with FIG. 1. The electrode 12 is positioned by an automatic welding head unit 16. The skate 14 is driven around the annular structure 15 by a motor 18 supported on the skate. The motor 18 drives pinion gear 20 which has teeth engaging the gear teeth 21 on the annular member 24. Filler wire on spool 22 is applied through feeder 23 to the welded seam, in a known manner.

The radiation from the weld is sensed by an optical sensing element 30 within the tubular members. Radiation from the weld enters the flared tubular member 32 and passes through an optical directing device such as a collimator 34 to the sensing element. An inert gas may be applied through the tube 36, collimator 34 and the flared member 32 to the back side of the weld as indicated at 38. The tube 36 supports the sensing element 30, and is in turn supported by a tripod structure having arms 40, 41 and 42 with rollers 44 at the ends to support the same within the tubular member 10.

A synchronous pick up unit 46 (FIG. 2) has a pinion engaging the teeth 21 and provides a voltage representing the movement of the skate 14. This voltage is applied to control 48 (FIG. 1) which provides operating voltage to motor 50 which drives the tube 36. The control operates to rotate the tube 36 in synchronism with the movement of the welding head so that the funnel 32 is always directed toward the opposite side of the workpiece at the portion being welded.

The radiation sensing device 30 may be a device which responds to the infrared radiation of the metal being welded, and photocells which have this characteristic are known. A direct current potential is applied to the device 30 by the power supply including transformed 52, rectifier bridge 53, filter 54 and zener diodes 55 and 56. Switch 58 selectively applies the potential at terminal 59, which is the voltage across zener diode 56, or the potential at terminal 60, which is the total voltage across zener diodes 55 and 56, to the photocell. The circuit of the photocell is completed to ground through resistors 62 and 63.

The impedance of the sensing device 30 will vary depending upon the infrared radiation applied thereto, to thereby control the current through the circuit and the voltage developed across resistors 62 and 63. The control voltage developed across these resistors is applied to the grid of tube 65, to which operating potential is applied from power supply 66. Resistor 67 and regulator tubes 68 and 69 apply regulated potentials to the plate and screen of tube 65. A reference voltage is developed across zener diode 70 by the power supply including transformer 71 and rectifier bridge 72. The output voltage at the anode of tube 65 is combined with the reference voltage across zener diode 70 and applied to the grid of tube 75. It is necessary to adjust the output voltage of tube 65 by the reference voltage across diode 70 to provide an input voltage for the grid of tube 75 which is in the voltage range required by this tube. Tube 75 acts as a cathode follower and the output is derived across its load resistor 63.

To stabilize and linearize the gain of the amplifier including tubes 65 and 75, feedback is provided from the cathode of tube 75 to the grid of tube 65 through resistor 62. Therefore, resistors 62 and 63 across which the input voltage for the amplifier is developed also function as a feedback resistor and as the output load resistor, respectively. In order to compensate for variations in the control voltage resulting from the varying impedance of the sensing device 30 caused by minor variations in the surface of the material being welded, a second feedback path is provided including resistor 77 and capacitor 78. This path has reduced impedance at high frequency to increase the feedback and reduce the amplifier gain for high frequency signals, so that rapid changes in the control signal are smoothed out.

The reference voltage for the system is derived by resistors 81 and 82 connected across the voltage regulators 68 and 69. Resistor 82 is a potentiometer having a movable tap for adjusting the reference voltage. Potentiometer 83 is connected between the tap on potentiometer 82 and point 80 connected to the cathode of tube 75, and the difference between the reference voltage and the voltage produced by tube 75 is developed thereacross. Potentiometer 83 has a movable tap 84 for selecting the desired part of the difference voltage. Capacitor 85 is connected between this movable tap and the point 80. The voltage between tap 84 and point 80 forms the control voltage for the current controlling system.

A meter 86 is connected through switch 87 and resistors 88 and 89 across the control voltage to give a visual indication of the amplitude thereof. Switch 87 can be moved to the dotted position to connect the meter across the entire potentiometer 83 to indicate the difference of the voltage between the cathode of tube 75 and the reference voltage potentiometer 82. This develops a more responsive meter swing and provides a standard output level indication. This standard level is useful for checking and setting the degree of photocell illumination necessary to drive the control voltage to zero. A switch 90 selectively shorts out resistor 89 to provide meter readings in a different range. This position is useful for checking sensitivity. The meter 86 may have a zero center setting so that it indicates the polarity as well as the value of the potential between terminals 80 and 84.

The control voltage between terminals 80 and 84 is applied to proportional amplifier 92 and integral amplifier 93, which may be constructed as described in Patent No. 3,237,075. The integral amplifier 93 responds to slow changes of the control signal and the proportional amplifier 92 responds to rapid changes in the signal. The outputs of the two amplifiers are applied to control circuit 94 which in turn controls the welding current supply 95. The current supply 95 applies through conductor 96 connected to the electrode 12, with the return being from the work piece through conductor 97. The level of the welding current is therefore controlled in response to the radiation received by the sensing device 30.

Considering now the operation of the system, when the arc is produced at the welding electrode 12, the photocell 30 will sense the intensity of the infrared radiated by the puddle of molten metal in the workpiece produced by the heat of the arc. The system can be started in any known way, and the control system of the invention will take over after the arc is started. Switch contact 58 is operated to select the sensitivity of the system. The potentiometer 82 is set to produce a reference voltage corresponding to the desired weld penetration. The system will then produce a control voltage when the current through tube 75 produces an output voltage across cathode resistor 63 which differs from the reference voltage. The setting of the tap 84 of potentiometer 83 controls the welding current change rate resulting from the difference of the control voltage from the reference voltage. It will be apparent that when the tap 84 is set near the point 80 a minimum signal will be derived therefrom to cause a minimum change rate in the welding current. When the tap 84 is set near the connection to potentiometer 82, a large control signal will be applied so that a greater rate of change will be produced by the welding current supply.

As the control signal is zero when the penetration is at the desired level, the setting of potentiometer 83 has no effect at this time but controls only the degree of the response of the system to a voltage indicating that the penetration is not at the desired level. The degree of response desired will depend upon the particular welding operation being performed. When a very fast response is produced, there may be a tendency in the system to oscillate about the center point which may be objectionable. The meter 86 when connected through switch 87 to tap 84 indicates the magnitude of the control signal 87 which is applied to the welding current supply. This indicates the change in weld penetration required, and the requirement for change in welding current supplied to produce the desired weld penetration.

In FIG. 3 there is shown a second embodiment of the weld penetration control system wherein the radiation is sensed by a fixed structure. The construction of the electrode 12, welding head 16, skate 14 and annular supporting structure 15 are the same as shown in FIG. 2. The motor for driving the skate 14 may likewise be the same. The sensing structure is different, however, and includes a plurality of radiation sensing pick up elements 101 to 112, inclusive. The individual sensing elements may be similar to the element 30 in FIG. 1 but each must sense an arcuate portion of the annular welded seam. The 12 elements must each cover an arc of more than 30° so that the 12 elements sense the entire periphery of the annular structure.

The elements 101 to 112 are selectively connected into the circuit by contacts 114 on the supporting structure 15, which are selectively engaged by contact 115 connected to the skate 14. One contact 114 is connected to each sensing element, and the contacts have an arcuate extent corresponding to the extent of the portions sensed by the individual sensing elements. The elements 101 to 112 are connected to a control unit 116, having one fixed connection thereto and a second connection through the contacts 114 to contact 115 which is connected to the control unit. In the position shown, the sensing element 101 has been connected to the control unit 116 to control the operation thereof to thereby control the weld penetration, and the sensing element 102 is being connected to control the operation over the next arcuate portion.

The control unit 116 may include the elements shown in FIG. 1, with the connection from switch 58 in FIG. 1 extending to contact 115 in FIG. 3, and the common connection from the sensing devices in FIG. 3 extending to the grid of tube 65 and to resistor 62 in FIG. 1. The control unit 116 includes a welding current supply such as 95 in the system of FIG. 1, which is connected to the welding electrode 12 by conductor 118 and to the work piece by conductor 119. The control unit will control the current supplied to the electrode 12 in the manner described in connection with FIG. 1.

The system of the invention has been found to be very effective in controlling the weld penetration in the welding of abutting tubular members. The use of a radiation sensing device within the tubular members, which operates synchronously with the movement of the welding electrode about the periphery of the members makes it possible to accurately sense the radiation from the weld and control the weld penetration.

We claim:

1. Welding apparatus for providing a weld in a tubular workpiece including in combination, a welding electrode for striking an arc with the tubular workpiece, supporting means for said welding electrode adapted to move the electrode about the periphery of the tubular workpiece, welding current supply means connected to said welding electrode and to the workpiece for providing controlled current through the welding arc, radiation sensitive means responsive to emission from the workpiece, said radiation sensitive means operating in synchronism with movement of said welding electrode to sense the radiation from the portion of the workpiece being welded, circuit means coupled to said radiation sensitive means for producing a control voltage which varies with the radiation sensed, and control means connected to said circuit means and to said welding current supply means and responsive to said control voltage to control the current supplied to the arc by said welding current supply means.

2. Welding apparatus in accordance with claim 1 wherein said supporting means includes an annular structure extending about the tubular workpiece, and a skate movably positioned on said annular structure for supporting said welding electrode.

3. Welding apparatus in accordance with claim 2 wherein said annular structure includes an annular ring with gear teeth thereon, and including motor means supported on said skate having a drive shaft with a gear thereon engaging said gear teeth to drive said skate about said annular structure.

4. Welding apparatus in accordance with claim 3 wherein said radiation sensing means includes a sensing device rotatably positioned within the workpiece and further motor means for rotating the same, and including pick up means on said skate for producing a signal representing movement or said electrode supported thereby, and control means responsive to said signal for operating said further motor means to direct said sensing device toward the opposite side of the workpiece from the welding electrode.

5. Welding apparatus in accordance with claim 1 wherein said radiation sensing means includes a sensing device rotatably positioned within the workpiece, and means for moving said sensing device for directing the same towards the opposite side of the workpiece from the welding electrode.

6. Welding apparatus in accordance with claim 5 including tubular means having a first portion coaxial with the tubular workpiece and a right angle portion having a flared end adjacent the workpiece, with said sensing device being positioned at the junction of said portions and responsive to radiation received through said flared end.

7. Welding apparatus in accordance with claim 6 wherein said radiation sensing means includes collimator means positioned in said right angle portion of said tubular means between said sensing device and said flared end.

8. Welding apparatus in accordance with claim 6 including means applying an inert gas through said tubular means and out said flared end thereof against the workpiece.

9. Welding apparatus in accordance with claim 1 wherein said radiation sensing means includes a plurality of sensing elements in fixed positions within the workpiece and each sensing a portion of the periphery to be welded, and said circuit means includes switch means selectively connecting said elements thereto as the welding electrode moves across the associated portion of the workpiece.

10. Welding apparatus in accordance with claim 9 wherein said supporting means includes an annular structure extending about the tubular workpiece and a skate supporting said welding electrode and movably positioned on said annular structure, said switch means includes a plurality of arcuate contacts on said annular structure individually connected to said sensing elements, and a movable contact supported by said skate to connect each sensing element to said circuit means during movement of said welding electrode across the portion of the periphery of the workpiece sensed by such element.

References Cited

UNITED STATES PATENTS

| 1,846,470 | 10/1932 | Burnish | 219—60 |
| 3,219,789 | 11/1965 | Branch et al. | 219—60 |

RICHARD M. WOOD, *Primary Examiner.*